United States Patent
Priester Steeley et al.

(10) Patent No.: US 11,758,881 B1
(45) Date of Patent: Sep. 19, 2023

(54) PET BATHING ENCLOSURE

(71) Applicants: Linda Priester Steeley, Tampa, FL (US); Mark Schonbrun, Tampa, FL (US)

(72) Inventors: Linda Priester Steeley, Tampa, FL (US); Mark Schonbrun, Tampa, FL (US)

( * ) Notice: Subject to any disclaimer, the term of this patent is extended or adjusted under 35 U.S.C. 154(b) by 210 days.

(21) Appl. No.: 17/366,464

(22) Filed: Jul. 2, 2021

(51) Int. Cl.
    *A01K 13/00* (2006.01)
    *A47K 3/022* (2006.01)

(52) U.S. Cl.
    CPC .......... *A01K 13/001* (2013.01); *A47K 3/022* (2013.01)

(58) Field of Classification Search
    CPC ..... A01K 13/001; A01K 13/003; A47K 3/022
    See application file for complete search history.

(56) References Cited

U.S. PATENT DOCUMENTS

| | | | | |
|---|---|---|---|---|
| 2,264,201 A * | 11/1941 | Findlay | ................ | A01K 13/003 119/665 |
| 4,020,796 A * | 5/1977 | Grifa | ................ | A01K 13/001 119/671 |
| 4,782,792 A * | 11/1988 | Anthony | ................ | A01K 13/001 119/665 |
| 5,213,064 A * | 5/1993 | Mondine | ................ | A01K 13/001 4/567 |
| 5,243,931 A * | 9/1993 | McDonough | ................ | A01K 13/001 119/676 |
| 5,448,966 A * | 9/1995 | McKinnon | ................ | A01K 13/001 119/676 |
| 5,974,601 A | 11/1999 | Drane | | |
| 6,988,467 B1 | 1/2006 | Smith | | |
| 7,107,937 B1 * | 9/2006 | Anderson | ................ | A01K 13/001 119/665 |
| 7,421,978 B2 * | 9/2008 | Price | ................ | A01K 13/001 119/671 |
| 8,757,097 B1 * | 6/2014 | Autumn | ................ | A61D 11/00 119/665 |
| 9,216,432 B2 * | 12/2015 | Lea | ................ | E03C 1/0408 |
| 10,463,020 B2 * | 11/2019 | Phifer | ................ | A01K 15/04 |
| 10,568,466 B2 * | 2/2020 | Hawkins | ................ | A47K 3/28 |

(Continued)

FOREIGN PATENT DOCUMENTS

CA      2689799 A1 * 7/2010 ........... A01K 13/001

*Primary Examiner* — Ebony E Evans
(74) *Attorney, Agent, or Firm* — SANCHELIMA & ASSOCIATES, P.A.; Christian Sanchelima; Jesus Sanchelima

(57) ABSTRACT

A pet bathing enclosure including a water manifold assembly, a shower system assembly, a spray system assembly, and an enclosure assembly is disclosed. These assemblies in conjunction with one another provide a simple solution to bathing a user's pet. The water manifold assembly includes a hose intake and serves as a mounting point for the control knobs of the spray system and shower system. The shower system includes a hose with shower head that can be held in a user's hand to direct water flow to desired locations. The spray assembly includes interconnected water flow lines with water output spouts lining the water flow lines. Thereby spraying the pet with water while in the enclosure assembly. The spray assembly is mounted to the inner perimeter of the enclosure assembly. The enclosure assembly includes drainage along the bottom edge to allow for excess water to drain out while bathing the pet.

5 Claims, 3 Drawing Sheets

(56) References Cited

U.S. PATENT DOCUMENTS

| | | | |
|---|---|---|---|
| 10,779,511 B1* | 9/2020 | Sterling | B08B 3/026 |
| 10,952,408 B1* | 3/2021 | Frost | A47K 3/03 |
| 2003/0024485 A1* | 2/2003 | Freidell | A01K 13/001 |
| | | | 119/673 |
| 2004/0078887 A1* | 4/2004 | Kuntz | A47K 3/022 |
| | | | 4/556 |
| 2011/0067645 A1* | 3/2011 | Arndt | A01K 13/001 |
| | | | 119/673 |
| 2016/0128302 A1* | 5/2016 | Stauber | A01K 13/001 |
| | | | 119/671 |

* cited by examiner

PET BATHING ENCLOSURE

BACKGROUND OF THE INVENTION

1. Field of the Invention

The present invention relates to a pet bathing enclosure and, more particularly, to a pet bathing enclosure that includes an integrated shower system.

2. Description of the Related Art

Several designs for a pet bathing enclosure have been designed in the past. None of them, however, include an integrated shower system with a spray system lining the inner perimeter of the enclosure.

Applicant believes that a related reference corresponds to U.S. Pat. No. 5,974,601 issued for a small animal washing container having drain holes. Applicant believes another related reference corresponds to U.S. Pat. No. 6,988,467 issued for a small animal bathing apparatus having a draining floor. None of these references, however, illustrate a pet bathing enclosure that includes a portable receptable having vertical walls with multiple apertures, and a mesh floor for drain water.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a pet bathing enclosure that includes an integrated shower system head.

It is another object of this invention to provide a pet bathing enclosure that includes a mesh mat atop drainage holes for added pet comfort.

It is still another object of the present invention to provide a pet bathing enclosure that includes a portable pet receptacle.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
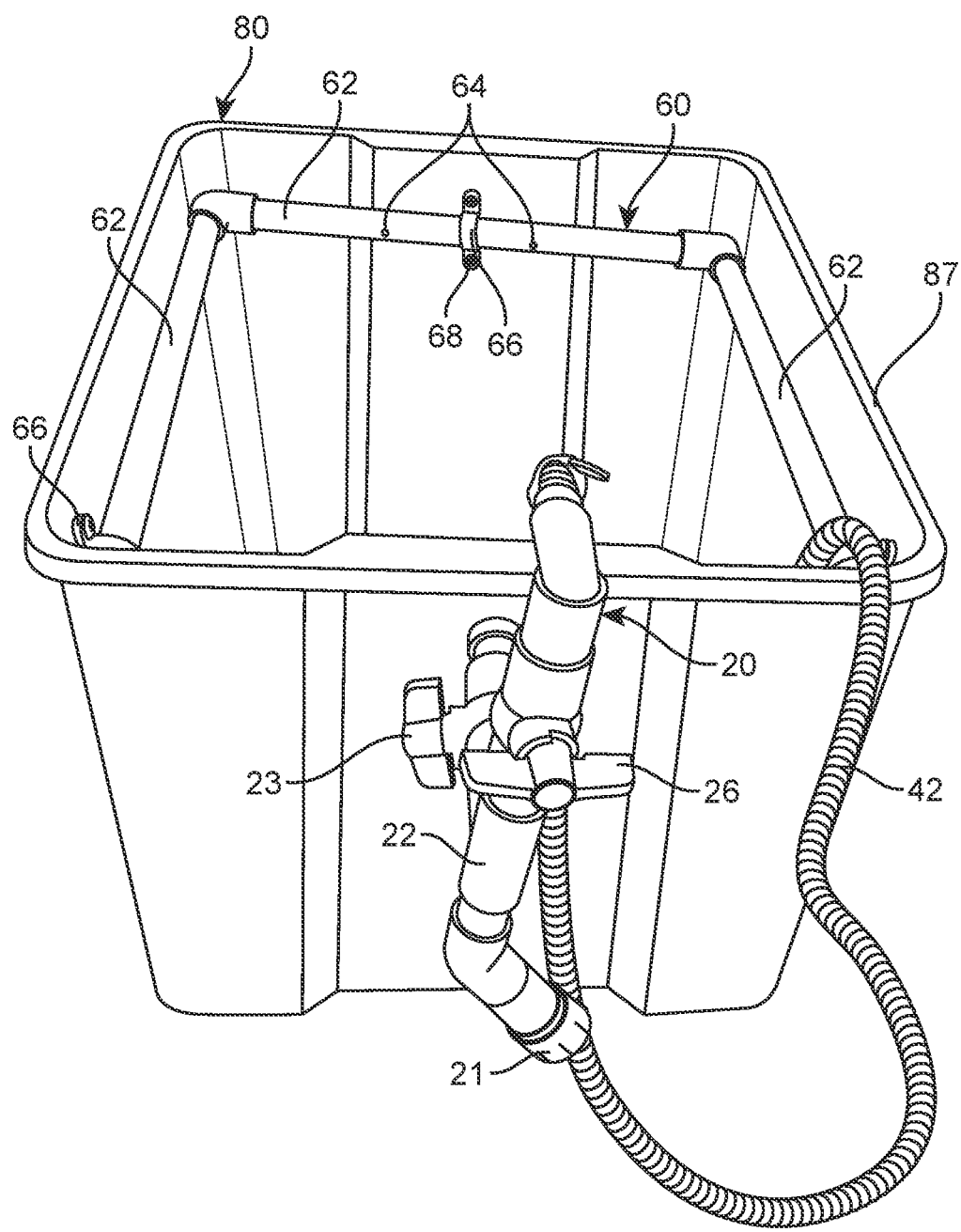
FIG. 1 represents a front view of an enclosure assembly 80 with four perimeter walls and a water manifold assembly 20 mounted to the exterior front wall of the enclosure assembly 80. The shower hose 42 extends from the top end of the water manifold assembly 20 and it shown here placed within the enclosure assembly 80. The water manifold assembly 20 traverses the exterior front wall of the enclosure assembly 80 to supply water to the spray system assembly 60.

Referring now to the drawings, where the present invention is generally referred to with numeral 10, it can be observed that it basically includes a water manifold assembly 20, a shower system assembly 40, a spray system assembly 60, and an enclosure assembly 80.

Figure 2:
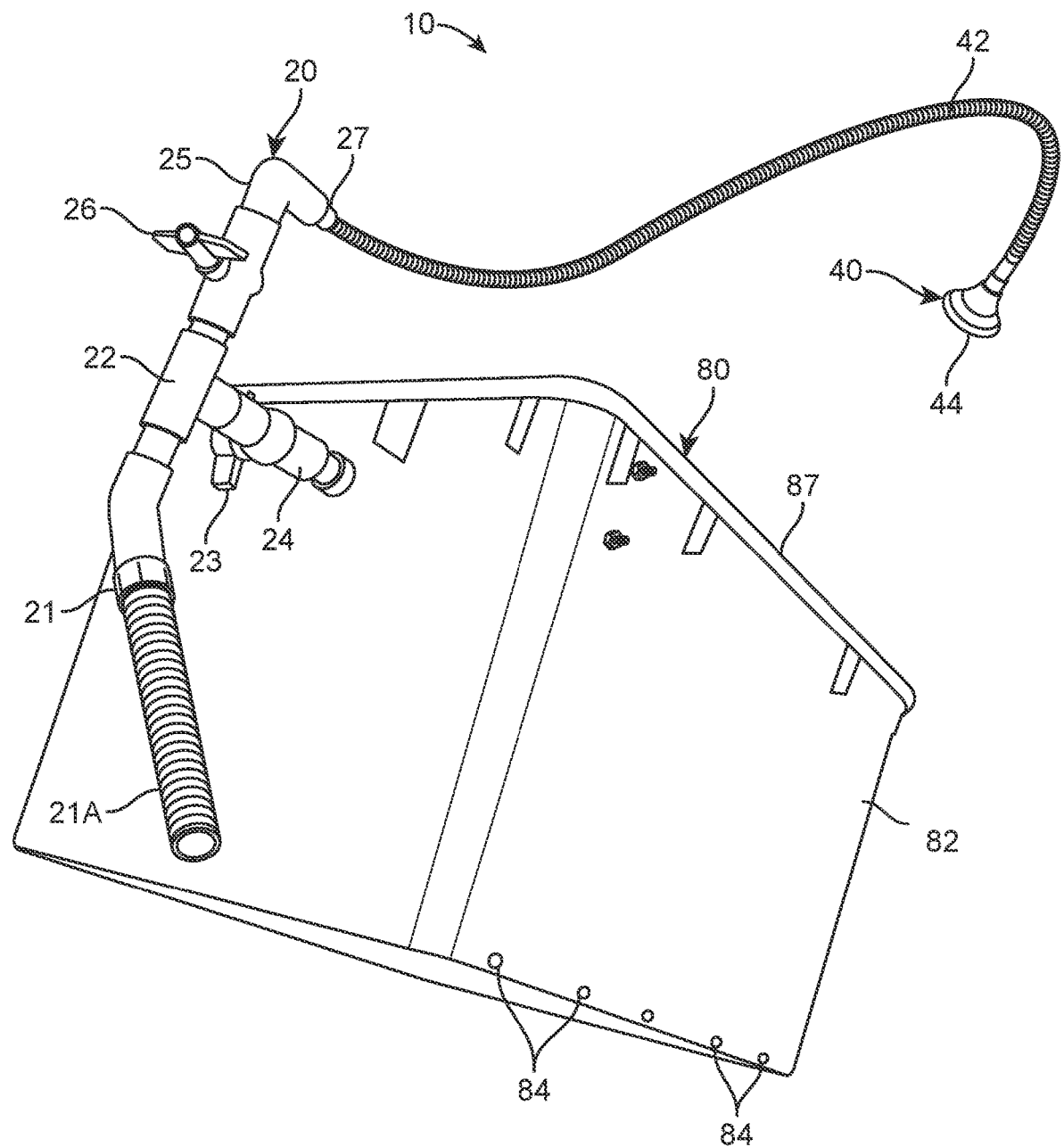
FIG. 2 shows a front perspective view with drainage holes 84 lining a bottom edge of enclosure 82. Located at the bottom end of the water manifold assembly 20 is a water intake 21 that includes a hose 21A connected thereto. The hose 21A supplies the water to the shower system assembly 40 and to the interior of the enclosure assembly 80 upon the actuation of the spray system control knob 23 and the shower system control knob 23.

Best illustrated in FIG. 1-2, water manifold assembly 20 may be a series of interconnected pipes supplying water to the shower system assembly 40 and the spray system assembly 60. Water manifold assembly 20 may include a water intake 21. Water intake 21 may serve as a mounting point for hose 21A. Hose 21A may be the source of water for the pet bathing enclosure 10. It may be suitable for the single water intake 21 to create a flow of water into a T-junction 22. The T-junction 22 may connect the water intake 21 to spray system intake 24 and to shower system intake 25. Between the spray system intake 24 and the T-junction 22 may be a spray system control knob 23. The spray system control knob 23 may actuate the flow of water into the spray system assembly 20. Located at an opposing end of the T-junction 22 with respect to the water intake 21 may be shower system control knob 26. Shower system control knob 26 may control the flow of water to shower system assembly 40 via a shower system intake 25. Shower system intake 25 may include a shower system mounting point 27 at a top distal end with respect to the water manifold assembly 20 body.

Referring now to FIG. 2, it may be suitable for shower system assembly 40 to include a shower hose 42 and a shower head 44. Shower hose 42 may be mounted to shower system mounting point 27. In one embodiment shower hose 42 may be made out of a flexible material. Shower hose 42 may also include a shower head 44 mounted to the distal end with respect to the end of shower hose 42 mounted to the shower system mounting point 27. Thereby allowing the free movement of shower head 44 while it is held by a user. It may be preferable for the shower head 44 to have varying pressurization modes to suit a pet's bathing needs.

Figure 3:
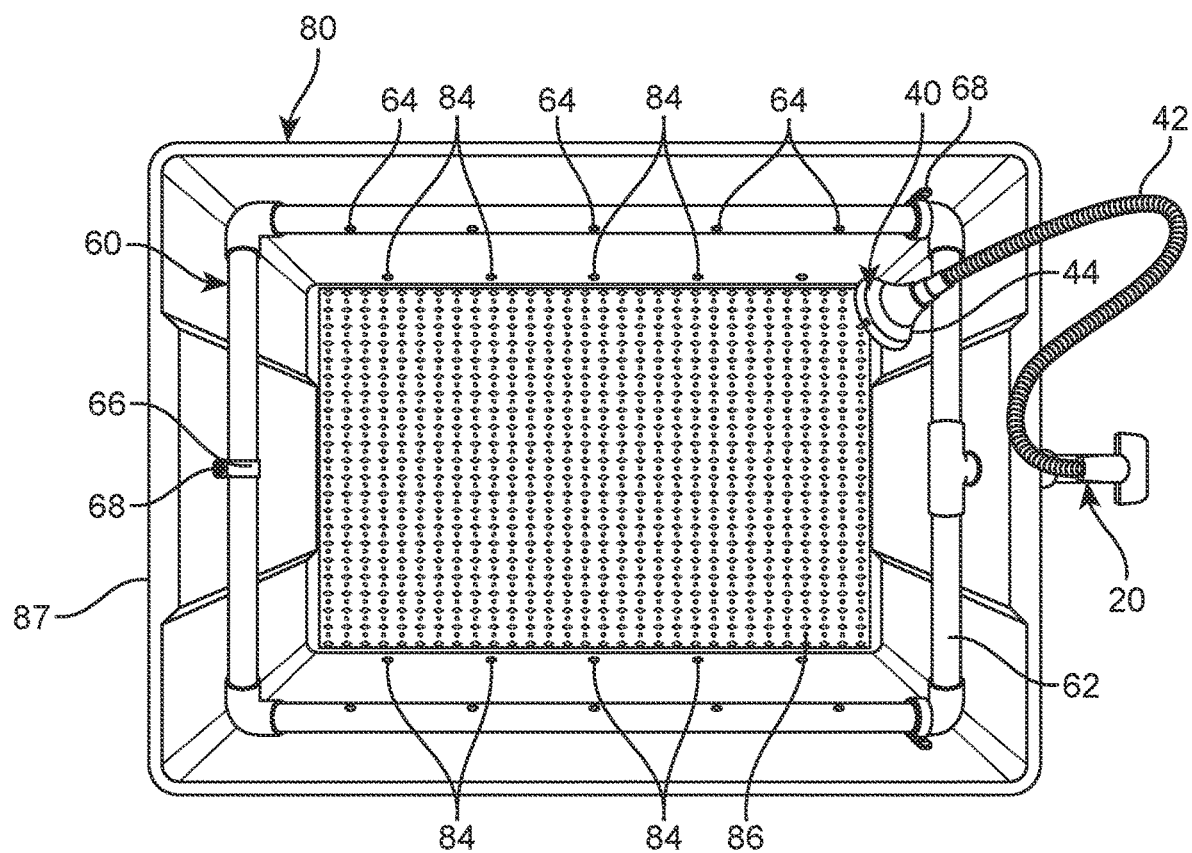
FIG. 3 illustrates a top view into enclosure assembly 80 with an internally mounted spray system assembly 60 and a plurality of spray holes 64 along flow lines 62 to help in the rinsing of the pet. In addition, shower assembly 40 is mounted to the enclosure assembly 80 for a user to manually rinse the pet while spray holes 64 are selectively actuated. Drain holes 64 can also be seen along the bottom inner edge of enclosure assembly 80 to prevent the water level from uncomfortably dangerously rising too high.

Best shown in FIG. 2-3, spray system assembly 60 may be mounted to spray system intake 24. Spray system assembly 60 may include a series of interconnected pipes lining an interior perimeter of enclosure assembly 80. Spray system intake 24 may traverse the wall of enclosure assembly 80 and culminate into a pipe connector with two ends. Said two ends including an anchor point for flow lines 62. Flow lines 62 may be pipes with a plurality of openings defining spray output 64. It may be suitable for flow lines 62 to create a circuit of flowing water about the interior perimeter of enclosure assembly 80. The spray output 64 openings may release water into the enclosure assembly 80 to help spray the pet with water from all surrounding sides therein. It may be preferable for flow lines 62 to be attached to the interior of enclosure assembly 80 via a mounting bracket 66. Said mounting brackets 66 attached to the interior walls of enclosure assembly 80 with bracket fastener 68. Thereby holding the flow lines 62 at a predetermined height.

As best depicted in FIG. 2-3 enclosure assembly 80 may include an enclosure 82. In one embodiment enclosure 82 may include a base with four upright side walls and a top open portion. The four upright walls defining a front face, rear face and two lateral faces. It may be suitable for the front face and rear face of enclosure 82 to include handles mounted at an exterior of said front face and rear face near a top edge. Lining a bottom edge of the two lateral faces may be a plurality of drainage holes 84. Drainage holes 84 may create an opening by which excess water, accumulated during pet bathing, can escape to the exterior of enclosure 82. Located atop of the enclosure 82 base may be a mesh mat 86. Mesh mat 86 may be a non-slip cushion that a pet can rest their feet on with openings. Thereby still allowing water to flow through the drainage holes 84. It may be suitable for enclosure 82 to be mounted on a height adjustable stand to accommodate the height of different users. It may also be suitable for a top edge of enclosure 82 to serve as a mounting point for an accessories basket adapted to fit soaps or bathing tools. The enclosure 82 may include a lining portion 87 extending about a top perimeter thereof. The lining portion 87 may protrude outwardly form the top perimeter of the enclosure 82. The lining portion 87 may be used to hold the enclosure 82.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a pet bathing enclosure, comprising:
   a. a water manifold assembly including a water intake, a spray system control knob, a spray system intake, a shower system control knob, and a shower system intake, said water manifold is mounted to an exterior of the enclosure; and
   b. a shower system assembly including a shower hose with a shower head, wherein said shower head with a tapered shape includes varying water pressurization settings; and
   c. a spray system assembly including interconnected pipes defining flow lines, the flow lines including a plurality of openings for the expulsion of water, said flow lines are made of a PVC material; and
   d. an enclosure assembly including an enclosure and a meshed mat, wherein said enclosure includes a base with lateral walls perpendicularly joined to a perimeter edge of the base, said perimeter edge of the base including drainage holes, said drainage holes are two sets of holes, wherein a first set is located at a bottom portion of a left wall of said lateral walls, wherein a second set is located at a bottom portion of a right wall of said lateral walls, wherein said drainage holes are equidistantly disposed therebetween, said lateral walls including the flow lines mounted thereon, wherein said lateral walls includes four upright solid walls, wherein said lateral walls include externally mounted handles for the portability of the enclosure, said meshed mat lining a bottom of the enclosure, wherein said meshed mat lining is a non-slip cushion placed parallel or below said drainage holes, wherein said enclosure has a lining portion extending about a top perimeter thereof, said lining portion protruding from said top perimeter.

2. A system for a pet bathing enclosure of claim 1 wherein said water intake flows water through said hose, through said flow lines or simultaneously to spray system intake and shower system intake via a by means of said system control knob and said spray system control knob coupled to a T-junction.

3. A system for a pet bathing enclosure of claim 1 wherein said flow lines are mounted in a circuit configuration in constant abutting contact to an interior of said lateral walls and proximal to a top perimeter thereof.

4. A system for a pet bathing enclosure of claim 3 wherein each pipe of said flow lines are mounted via mounting brackets.

5. A system for a pet bathing enclosure, consisting of:
   a. a water manifold assembly including a water intake, a spray system control knob, a spray system intake, a shower system control knob, and a shower system intake, said water manifold is mounted to an exterior of the enclosure; and
   b. a shower system assembly including a shower hose with a shower head, wherein said shower head with a tapered shape includes varying water pressurization settings; and
   c. a spray system assembly including interconnected pipes defining flow lines, the flow lines including a plurality of openings for the expulsion of water, said flow lines are made of a PVC material, wherein said water intake flows water through said shower hose, through said flow lines or simultaneously to spray system intake and shower system intake via a by means of said system control knob and said spray system control knob coupled to a T-junction, wherein each of said interconnected pipes of said flow lines are mounted via mounting brackets; and
   d. an enclosure assembly including an enclosure and a meshed mat, wherein said enclosure includes a base with lateral walls perpendicularly joined to a perimeter edge of the base, said perimeter edge of the base including drainage holes, said drainage holes are two sets of five holes, wherein a first set of said two sets is located at a bottom portion of a left wall of said lateral walls, wherein a second set of said two sets is located at a bottom portion of a right wall of said lateral walls, wherein said drainage holes are equidistantly disposed therebetween, said lateral walls including the flow lines mounted thereon, wherein said lateral walls includes four upright solid walls, wherein said lateral walls include externally mounted handles for the portability of the enclosure, said meshed mat lining a bottom of the enclosure, wherein said meshed mat lining is a non-slip cushion placed parallel or below said drainage holes, wherein said enclosure has a lining portion extending about a top perimeter thereof, said lining portion protruding from said top perimeter.

* * * * *